US007022783B2

(12) United States Patent
Hsu et al.

(10) Patent No.: US 7,022,783 B2
(45) Date of Patent: Apr. 4, 2006

(54) GROUP III-B METAL CATALYST SYSTEM

(75) Inventors: Wen-Liang Hsu, Cuyahoga Falls, OH (US); Adel Farhan Halasa, Bath, OH (US); Chad Aaron Jasiunas, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 63 days.

(21) Appl. No.: 10/765,485

(22) Filed: Jan. 27, 2004

(65) Prior Publication Data

US 2004/0186252 A1 Sep. 23, 2004

Related U.S. Application Data

(63) Continuation-in-part of application No. 10/331,259, filed on Dec. 30, 2002, now abandoned.

(60) Provisional application No. 60/345,758, filed on Dec. 31, 2001.

(51) Int. Cl.
*C08F 4/52* (2006.01)
*C08F 236/06* (2006.01)
*C08F 236/08* (2006.01)

(52) U.S. Cl. ...................... 526/164; 526/144; 526/337; 502/103; 502/128

(58) Field of Classification Search ................ 526/144, 526/164, 339, 337; 502/103, 128
See application file for complete search history.

(56) References Cited

U.S. PATENT DOCUMENTS

| | | | | |
|---|---|---|---|---|
| 4,663,405 A | | 5/1987 | Throckmorton | 526/144 |
| 5,405,815 A | | 4/1995 | Bell et al. | 502/102 |
| 5,502,126 A | | 3/1996 | Bell et al. | 526/142 |
| 6,130,299 A | * | 10/2000 | Sone et al. | 526/89 |

* cited by examiner

*Primary Examiner*—Caixia Lu
(74) *Attorney, Agent, or Firm*—Alvin T. Rockhill

(57) ABSTRACT

The subject invention relates to a technique for synthesizing rubbery non-tapered, random, copolymers of 1,3-butadiene and isoprene. These rubbery copolymers exhibit an excellent combination of properties for utilization in tire sidewall rubber compounds for truck tires. By utilizing these isoprene-butadiene rubbers in tire sidewalls, tires having improved cut growth resistance can be built without sacrificing rolling resistance. Such rubbers can also be employed in tire tread compounds to improve tread wear characteristics and decrease rolling resistance without sacrificing traction characteristics. This invention more specifically discloses a process for the synthesis of isoprene-butadiene rubber which comprises copolymerizing isoprene monomer and 1,3-butadiene monomer in an organic solvent in the presence of a Group III-B metal containing catalyst system that is made by the sequential steps of (I) reacting an organometalic compound that contains a metal from Group III-B of the Periodic System with an organoaluminum compound at a temperature which is within the range of 50° C. to 100° C. to produce an aluminum modified Group III-B metal containing catalyst component, and (II) mixing the aluminum modified Group III-B metal containing catalyst component with a halogen containing compound, wherein the catalyst system is void of compounds selected from the group consisting of aliphatic alcohols, cycloaliphatic alcohols, aliphatic thiols, cycloaliphatic thiols, trialkyl silanols, and triaryl silanols.

12 Claims, No Drawings

GROUP III-B METAL CATALYST SYSTEM

This is a continuation-in-part application of U.S. patent application Ser. No. 10/331,259, filed on Dec. 30, 2002 now abandoned, which claims the benefit of U.S. patent application Ser. No. 60/345,758, filed on Dec. 31, 2001.

BACKGROUND OF THE INVENTION

In the copolymerization of 1,3-butadiene and isoprene with unmodified neodymium catalysts, the 1,3-butadiene polymerizes about 19 times faster than the isoprene. For this reason, such copolymers do not have a random distribution of monomers. One end of the polymer chains contain mostly repeat units which are derived from butadiene (which polymerized faster) and the other end of the polymer chains contain mostly repeat units which are derived from isoprene (which polymerized slower). As the polymerization proceeds, the availability of butadiene monomer for polymerization diminishes leaving more and more isoprene to polymerize subsequently. This causes such isoprene-butadiene rubbers to be tapered.

U.S. Pat. No. 4,663,405 discloses that conjugated diolefin monomers can be polymerized with a catalyst system which is comprised of (1) an organoaluminum compound, (2) an organometallic compound which contains a metal from Group III-B of the Periodic System, such as lanthanides and actinides, and (3) at least one compound which contains at least one labile halogen atom. U.S. Pat. No. 4,663,405 also discloses that the molecular weight of the polymers made with such catalyst systems can be reduced by conducting the polymerization in the presence of a vinyl halide. However, its teachings do not specifically disclose copolymerizations of isoprene with butadiene and do not provide any technique for making the isoprene monomer polymerize at a rate that is similar to that of the butadiene monomer. Thus, its teachings do not provide a technique for synthesizing random, non-tapered isoprene-butadiene rubbers with catalyst systems which are comprised of (1) an organoaluminum compound, (2) an organometallic compound which contains a metal from Group III-B of the Periodic System, such as lanthanides and actinides, and (3) at least one compound which contains at least one labile halogen atom.

U.S. Pat. No. 5,405,815 discloses a process or preparing a catalyst system which is particularly useful for copolymerizing isoprene and 1,3-butadiene monomers into rubbers which comprises the sequential steps of (1) mixing (a) an organoaluminum hydride, (b) a member selected from the group consisting of aliphatic alcohols, cycloaliphatic alcohols, aliphatic thiols, cycloaliphatic thiols, trialkyl silanols, and triaryl silanols, and (c) optionally, 1,3-butadiene in an organic solvent to produce a modified organoaluminum catalyst component; (2) adding an organometallic compound which contains a metal from Group III-B of the Periodic System to the modified organoaluminum catalyst component to produce a Group III-B metal containing catalyst component; (3) adding a compound which contains at least one labile halogen atom to the Group III-B metal containing catalyst component; and (4) aging the catalyst system after the compound which contains at least one labile halogen atom is added to the modified Group III-B metal containing catalyst component for a period of 10 minutes to 6 hours, wherein the catalyst system is aged at a temperature which is within the range of about 30° C. to about 85° C.

SUMMARY OF THE INVENTION

By utilizing the technique of this invention copolymers of isoprene and butadiene can be synthesized to higher molecular weights and higher cis-microstructure contents at faster polymerization rates. These copolymers also exhibit better processability and exhibit an excellent combination of properties for utilization in tire sidewall rubber compounds for truck tires. By utilizing these isoprene-butadiene rubbers in tire sidewalls, tires having improved cut growth resistance can be built without sacrificing rolling resistance. The isoprene-butadiene rubbers made by the process of this invention can also be employed in tire tread rubber compounds to improve the tread wear characteristics and decrease the rolling resistance of the tire without sacrificing traction characteristics.

The present invention discloses a process for the synthesis of isoprene-butadiene rubber which comprises copolymerizing isoprene monomer and 1,3-butadiene monomer in an organic solvent in the presence of a Group III-B metal containing catalyst system that is made by the sequential steps of (I) reacting an organometalic compound that contains a metal from Group III-B of the Periodic System with an organoaluminum compound at a temperature which is within the range of 50° C. to 100° C. to produce an aluminum modified Group III-B metal containing catalyst component, and (II) mixing the aluminum modified Group III-B metal containing catalyst component with a halogen containing compound, wherein the catalyst system is void of compounds selected from the group consisting of aliphatic alcohols, cycloaliphatic alcohols, aliphatic thiols, cycloaliphatic thiols, trialkyl silanols, and triaryl silanols. In the practice of this invention it is convenient to add the halogen containing compound and the aluminum modified Group III metal containing compound directly to the polymerization reactor as a separate components.

This invention also reveals a process for preparing a catalyst system that comprises the sequential steps of (I) reacting an organometalic compound that contains a metal from Group III-B of the Periodic System with an organoaluminum compound at a temperature which is within the range of 50° C. to 100° C. to produce an aluminum modified Group III-B metal containing catalyst component, and (II) mixing the aluminum modified Group III-B metal containing catalyst component with a halogen containing compound, wherein the catalyst system is prepared in the absence of compounds selected from the group consisting of aliphatic alcohols, cycloaliphatic alcohols, aliphatic thiols, cycloaliphatic thiols, trialkyl silanols, and triaryl silanols.

DETAILED DESCRIPTION OF THE INVENTION

The relative amount of isoprene and butadiene, which can be copolymerized with the catalyst system of this invention, can vary over a wide range. For example, the monomer charge composition can contain from about 1 weight percent to about 99 weight percent butadiene and from about 1 weight percent to 99 weight percent isoprene. In most cases, the monomer charge composition will contain from about 10 weight percent to about 90 weight percent butadiene and from about 10 weight percent to 90 weight percent isoprene. It is normally preferred for the monomer charge composition to contain from about 25 weight percent to about 75 weight percent butadiene and from about 25 weight percent to about 75 weight percent isoprene. It is generally more preferred in the case of automobile tires for the monomer charge composition to contain from about 50 weight percent to about 75 weight percent butadiene and from about 25 weight percent to about 50 weight percent isoprene. It is generally more preferred in the case of truck tires for the monomer charge composition to contain from about 25 to 50 weight percent 1,3-butadiene and 50 to 75 weight percent isoprene.

The polymerizations of the present invention are carried out in a hydrocarbon solvent that can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In solution polymerizations which utilize the catalyst systems of this invention, there will normally be from 5 to 35 weight percent monomers in the polymerization medium. Such polymerization mediums are, of course, comprised of an organic solvent, 1,3-butadiene monomer, isoprene monomer, and the catalyst system. In most cases, it will be preferred for the polymerization medium to contain from 10 to 30 weight percent monomers. It is generally more preferred for the polymerization medium to contain 12 to 18 weight percent monomers.

The catalyst system used in the process of this invention is made by a simplified two-step process. In the first step, an organoaluminum compound is reacted with an organometalic compound that contains a metal from Group III-B of the Periodic System. Unlike techniques of the prior art, it is not necessary to react the organoaluminum compound with an alcohol, a thiol, or a conjugated diolefin monomer, such as 1,3-butadiene, to attain good polymerization rates and high conversions. Accordingly, the catalyst systems of this invention are prepared in the absence of alcohols and thiols. Since it is not necessary for the catalyst system of this invention to be prepared in the presence of a conjugated diolefin monomer, such as 1,3-butadiene or isoprene, it is normally also prepared in the absence of such conjugated diolefin monomers.

In this first step, the organoaluminum compound is reacted with the compound that contains a metal from Group III-B of the Periodic System. It is critical for this step to be conducted at a temperature which is within the range of 50° C. to 100° C. The organoaluminum compound will preferably be reacted with the compound that contains a metal from Group III-B of the Periodic System at a temperature which is within the range of 60° C. to 85° C. and will more preferably be reacted at a temperature which is within the range of 65° C. to 75° C. The organoaluminum compound and the organometallic compound that contains a metal from Group III-B of the Periodic System will normally be allowed to react for a period of at least about 5 minutes to produce the aluminum modified Group III-B metal containing catalyst component. A period of about 5 minutes to about 60 minutes will typically be allowed for this reaction to occur. It is preferable to allow 20 minutes to 40 minutes for this reaction to occur.

The organoaluminum compounds that can be utilized are of the structural formula:

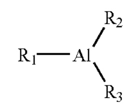

in which $R_1$, $R_2$, and $R_3$ are selected from the group consisting of alkyl groups (including cycloalkyl), aryl groups, alkaryl groups, arylalkyl groups, and alkoxy groups, It is preferred for $R_1$, $R_2$ and $R_3$ to represent alkyl groups which contain from 1 to about 12 carbon atoms. It is more preferred for $R_1$, $R_2$ and $R_3$ to represent alkyl groups which contain from 2 to 8 carbon atoms.

Some representative examples of organoaluminum compounds that can be utilized are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. The preferred organoaluminum compounds include triethyl aluminum (TEAL), tri-n-propyl aluminum, triisobutyl aluminum (TIBAL), trihexyl aluminum, and trioctylaluminum. Organoaluminum hydrides are normally not utilized in making the catalyst systems of this invention.

The Group III-B metal containing organometallic compounds which can be employed may be symbolically represented as $ML_3$ wherein M represents the Group III-B metal and wherein L represents an organic ligand containing from 1 to about 20 carbon atoms. The Group III-B metal will be selected from the group consisting of scandium, yttrium, lanthanides, and actinides. It is normally preferred for the Group III-B metal to be a lanthanide. The organic ligand will generally be selected from the group consisting of (1) o-hydroxyaldehydes, (2) o-hydroxyphenones, (3) hydroxyesters, (4) β-diketones, (5) monocarboxylic acids, (6) ortho dihydric phenols, (7) alkylene glycols, (8) dicarboxylic acids, and (9) alkylated derivatives of dicarboxylic acids.

The lanthanides which can be used in the organolanthanide compound include lanthanum, cerium, praseodymium, neodymium, promethium, samarium, europium, gadolinium, terbium, dysprosium, holmium, erbium, thulium, ytterbium, and lutetium. The preferred lanthanide metals include cerium, praseodymium, neodymium, and gadolinium which have atomic numbers of 58, 59, 60, and 64, respectively. The most preferred lanthanide metal is neodymium.

In the organolanthanide compound utilized, the organic portion includes organic type ligands or groups which contain from 1 to 20 carbon atoms. These ligands can be of the monovalent and bidentate or divalent and bidentate form. Representative of such organic ligands or groups are (1) o-hydroxyaldehydes such as salicylaldehyde, 2-hydroxyl-1-naphthaldehyde, 2-hydroxy-3-naphthaldehyde and the like; (2) o-hydroxyphenones such as 2'-hydroxyacetophenone, 2'-O- hydroxybutyrophenone, 2'-hydroxypropiophenone and the like; (3) hydroxy esters such as ethyl salicylate, propyl salicylate, butyl salicylate and the like; (4) β-diketones such as acetylacetone, benzoylacetone, propionylacetone, isobutyrylacetone, valerylacetone, ethylacetylacetone and the like; (5) monocarboxylic acids such as acetic acid, propionic acid, valeric acid, hexanoic acid, 2-ethylhexanoic acid, neodecanoic acid, lauric acid, stearic acid and the like; (6) ortho dihydric phenols such as pyrocatechol; (7) alkylene glycols such as ethylene glycol, propylene glycol, trimethylene glycol, tetramethylene glycol and the like; (8) dicarboxylic acids such as neodecanoic acid, oxalic acid, malonic acid, maleic acid, succinic acid, o-phthalic acid and the like; and (9) alkylated derivatives of the above-described dicarboxylic acids.

Representative organolanthanide compounds corresponding to the formula $ML_3$, which may be useful in this invention include cerium acetylacetonate, cerium naphthenate, cerium neodecanoate, cerium octanoate, tris-salicylaldehyde cerium, cerium tris-8-hydroxyquinolate), gadolinium naphthenate, gadolinium neodecanoate, gadolinium octanoate, lanthanum naphthenate, lanthanum octanoate, neodymium naphthenate, neodymium neodecanoate, neodymium octanoate, praseodymium naphthenate, praseodymium octanoate, yttrium acetylacetonate, yttrium octanoate, dysprosium octanoate, and other lanthanide metals complexed with ligands containing from 1 to about 20 carbon atoms.

The actinides which can be utilized in the Group III-B metal containing organometallic compound include actinium, thorium, protactinium, uranium, neptunium, plutonium, americium, curium, berkelium, californium, einsteinium, fermium, mendelevium, and lawrencium. The preferred actinides are thorium and uranium which have atomic numbers of 90 and 92, respectively. Some representative examples of organoactinides which can be employed include tris(π-allyl) uranium chloride, tris(π-allyl) uranium bromide, tris(π-allyl) uranium iodide, uranium tetramethoxide, uranium tetraethoxide, uranium tetrabutoxide, uranium octanoate, thorium tetraethoxide, tris(π-allyl) thorium chloride, thorium naphthenate, uranium isovalerate, thorium octanoate, tris(π-allyl) thorium bromide, tris(π-allyl) thorium iodide, thorium tetramethoxide, and the like.

The molar ratio of the Group III-B containing organometallic compound added to the amount of aluminum in the organoaluminum compound will typically be within the range of about 1:6 to about 1:40. It is generally preferred for the molar ratio of the Group III-B metal compound, such as the organolanthanide compound, to the organoaluminum compound to be within the range of about 1:8 to about 1:25. It is normally more preferred for the molar ratio of the Group III-B metal compound to the organoaluminum compound to be within the range of about 1:11 to about 1:20.

In the second step of the catalyst preparation procedure, the aluminum modified Group III-B metal containing catalyst compcmemt made in the first step is mixed with a halogen containing compound. The halogen containing compound will be void of labile halogen atoms, such as labile bromine atoms, labile chlorine atoms, labile fluorine atoms, and labile iodine atoms. The halogen containing compound can be virtually any halogenated organic compound that does not contain labile halogen atoms, such as a primary alkyl halide or an aryl halide. Some representative examples of halogen containing compounds that can be used include chloroform, carbon tetrachloride, phenyl chloride, phenyl bromide, naphthyl chloride, naphthyl bromide, dibromomethane, dichloromethane, methylenedichioride, methylenedibromide, hexachloroethane, hexabromoethane, and the like.

The molar ratio of the halogen containing compound to the aluminum modified Group III-B metal containing catalyst component will normally be within the range of about 1:1 to about 5:1. It is generally preferred for the molar ratio of the halogen atom containing compound to the Group III-B metal to be within the range of about 1:2 to about 3:1. It is normally more preferred for the ratio of the halogen containing compound to the Group III-B metal to be within the range of 1:1 to about 2:1.

In any case, the catalyst system of this invention will be prepared in the absence of compounds containing labile halogen atoms, such as (1) tertiary alkyl halides; (2) secondary alkyl halides; (3) aralkyl halides; (4) allyl halides; (5) hydrogen halides; (6) alkyl, aryl, alkaryl, aralkyl and cycloalkyl metal halides wherein the metal is selected from the Groups II, III-A and IV-A of the Periodic Table; (7) metallic halides, such as halides of metals of Groups III, IV, V, VI-B and VIII of the Periodic Table; (8) halosilanes; (9) halosulfides; (10) halophosphines; and (11) organometallic halides corresponding to the general formula $ML_{(3-y)}Xy$ wherein M is a metal selected from the group consisting of metals of Group III-B of the Periodic Table having atomic numbers of 21, 39, and 57 through 71 inclusive; L is an organic ligand containing from 1 to 20 carbon atoms and selected from the group consisting of (a) o-hydroxyaldehydes, (b) o-hydroxyphenones, (c) hydroxyquinolines, (d) β-diketones, (e) monocarboxylic acids, (f) ortho dihydric phenols, (g) alkylene glycols, (h) dicarboxylic acids, (i) alkylated derivatives of dicarboxylic acids and (j) phenolic ethers; wherein X is a halogen atom, wherein y is an integer ranging from 1 to 2 and represents the number of halogen atoms attached to the metal M, and wherein the organic ligand L may be of the monovalent and bidentate or divalent and bidentate form.

The catalyst system of this invention will accordingly be prepared in the absence of the following specific compounds that contain labile halogen atoms: (1) inorganic halide acids, such as hydrogen bromide, hydrogen chloride and hydrogen iodide; (2) organometallic halides, such as ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) inorganic halides such as aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like; and (4) organometallic (Group III-B) halides, such as t-butyl-salicylaldehydrocerium (III) chloride, salicylaldehydrocerium (III) chloride, 5-cyclohexylsalicylaldehydrocerium (III) chloride, 2-acetylphenolatocerium (III) chloride, oxalatocerium (III) chloride, oxalatocerium (III) bromide and the like; (5) tertiary alkyl halides, such as t-butyl bromide and t-octyl bromide; (6) secondary alkyl halides, such as isopropyl bromide and isopropyl chloride; (7) aralkyl halides, such as benzyl bromide and bromomethyl naphthalene; and (8) allyl halides, such as allyl bromide, 3-chloro-2-methylpropene, 1-bromobutene-2, and 1-bromopentene-2. The preferred compounds which contain labile halogen atoms are benzyl halides and allyl halides.

The aluminum modified Group III-B metal containing catalyst component and the halogen containing compound can be added to the polymerization medium as separate components. This can be done by simply adding the aluminum modified Group III-B metal containing catalyst component and the halogen containing compound separately to the polymerization medium that contains the isoprene, the 1,3-butadiene, and the organic solvent. In an alternative embodiment of this invention, the aluminum modified Group III-B metal containing catalyst component and the halogen containing compound can be mixed prior to the time that they are introduced into the polymerization reactor.

The catalyst system will typically be added at a level sufficient to provide from 0.05 to 0.5 millimoles of the Group III-B metal per 100 grams of total monomer. More typically, the catalyst system will be added in an amount sufficient to provide from 0.25 to 0.35 millimoles of the Group III-B metal per 100 grams of total monomer. Its use results in the formation of an essentially non-tapered, random isoprene-butadiene rubber that has excellent characteristics for use in making tires. This is due to the fact that the modification procedure causes the catalyst system to polymerize the butadiene monomer at a rate that is only about 1.2 times to 1.5 times faster than the rate of isoprene polymerization.

The polymerization temperature utilized can vary over a broad range of from about 0° C. to about 125° C. In most cases a temperature within the range of about 30° C. to about 85° C. will be utilized. Temperatures within the range of about 50° C. to about 75° C. are generally the most preferred polymerization temperatures. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique.

The isoprene-butadiene rubbers, which are made by utilizing the techniques of this invention in solution polymerizations, can be recovered utilizing conventional techniques. It may be desirable to add antioxidants to the polymer solution in order to protect the isoprene-butadiene rubber produced from potentially deleterious effects of contact with oxygen. The isoprene-butadiene rubber made can be precipitated from the polymer solution. The butadiene-isoprene rubber made can also be recovered from the solvent and residue by means such as decantation, filtration, centrification, and the like. Steam stripping can also be utilized in order to remove volatile organic compounds from the rubber.

The isoprene-butadiene rubbers made by the technique of this invention will typically have a glass transition temperature which is within the range of about −65° C. to about −115° C. Such isoprene-butadiene rubbers will also generally have a Mooney viscosity that is within the range of about 50 to about 120. The isoprene-butadiene rubber will more typically have a Mooney viscosity that is within the range of 70 to 100.

The isoprene-butadiene rubbers made by the technique of this invention can be blended with other sulfur-vulcanizable rubbers to make compounds which have excellent characteristics for use in tire treads. For instance, improved rolling resistance and treadwear characteristics can be attained without sacrificing wet or dry traction characteristics. The isoprene-butadiene rubbers of this invention will normally be blended with other polydiene rubbers in making tire tread compounds. More specifically, the isoprene-butadiene rubber can be blended with natural rubber, high cis-1,4-polybutadiene, medium vinyl polybutadiene (having a glass transition temperature which is within the range of −10° C. to −40° C.), synthetic 1,4-polyisoprene, 3,4-polyisoprene (having a glass transition temperature which is within the range of −10° C. to −45° C.), styrene-butadiene rubbers (having a glass transition temperature which is within the range of 0° C. to −80° C.) and styrene-isoprene-butadiene rubbers (having a glass transition temperature which is within the range of −10° C. to −80° C.) to make useful tire tread compounds. A highly preferred blend for utilization in tire treads includes natural rubber, 3,4-polyisoprene rubber and the isoprene-butadiene rubber of this invention.

Various blend ratios can be employed in preparing tire tread compounds which exhibit a highly desirable combination of traction, rolling resistance, and tread wear characteristics. Another specific blend which is highly advantageous for utilization in tire tread compounds is comprised of about 40 weight percent to about 60 weight percent styrene-isoprene-butadiene rubber having a glass transition temperature which is within the range of about −70° C. to about −80° C. and from about 40 weight percent to about 60 weight percent of the isoprene-butadiene rubber prepared in accordance with the process of this invention.

This invention is illustrated by the following examples which are merely for the purpose of illustration and are not to be regarded as limiting the scope of the invention or the manner in which it can be practiced. Unless specifically indicated otherwise, parts and percentages are given by weight.

COMPARATIVE EXAMPLE 1

In this experiment an isoprene-butadiene rubber was synthesized by the technique of this invention. In the procedure employed a one gallon (3.78 liter) reactor was charged with 1000 grams of a dry hexane solution containing 81.9 grams of 1,3-butadiene followed by 663 grams of 1.2 molar diisobutylaluminum hydride (DIBAH) in hexane (25 weight percent DIBAH). Then, a solution containing 21.5 grams of triphenylsilanol dissolved in 260 grams of toluene was charged into the reactor at a temperature of 18° C. and the contents of the reactor. After stirring for 40 minutes, a solution of 105.4 grams of 10.3% neodymium solution (as neodymium neodecanoate), diluted with 165 grams of dry hexane, was charged into the reactor. The solution was allowed to stir for one hour after which 19.1 grams of allylbromide was added. The cooling was stopped and the solution allowed to warm up to ambient temperatures. After stirring for about 90 minutes, the catalyst solution was heat aged at 65° C. for 1–2 hours. The aged catalyst solution was then cooled and stored in a dry container under nitrogen.

Then, 15.6 ml of the 0.025 molar aged neodymium catalyst solution (lanthanide containing catalyst component) was added to a solution containing 130 grams of isoprene and 130 grams of 1,3-butadiene in 1610 grams of dry hexane in a one gallon (3.78 liter) reactor under nitrogen at a temperature of 65° C. The polymerization was carried out with stirring for 3 hours. Periodically during the polymerization, samples of the polymerization solution were coagulated in a 60/40 volume percent mixture of ethanol/decane.

The coagulated polymer was allowed to settle at −20° C. followed by gas chromatographic analysis of the supernatant liquid to determine the residual monomer content. Subtraction from the initial monomer concentrations allowed calculation of the individual monomer conversions. These analyses showed that the incorporation of butadiene to isoprene in the polymer was 3 to 2 by weight indicating the formation of a highly random, essentially non-tapered isoprene-butadiene rubber.

COMPARATIVE EXAMPLE 2

In this experiment the copolymerization of Example 1 was repeated using a standard neodymium catalyst system (DIBAH/Nd/Allylbromide/Bd: 15/1/2/20 molar ratios) without the silanol modification of this invention. Gas chromatographic analyses of the residual monomers, as described in Example 1, showed the incorporation of butadiene to isoprene in the polymer was approximately 19 to 1 by weight, indicating the formation of a considerably less random, highly tapered copolymer.

COMPARATIVE EXAMPLE 3

In this experiment, an isoprene-butadiene copolymer rubber was prepared using an alcohol modified neodymium catalyst system. In this procedure, a one gallon (3.78 liter) reactor was charged with 1,214 grams of hexane containing 81.3 grams of butadiene and 558.43 grams of 1.23 molar diisobutylaluminum hydride (DIBAH) in hexane, (i.e., 25% weight percent DIBAH). The reactor was maintained at 20° C. by cooling. N-butanol (11.16 grams) was added with stirring. After stirring for thirty minutes, 107.5 grams of 10.1% neodymium solution (neodymium neodecanoate) diluted with 160 grams of dry hexane, was charged to the reactor. The solution was stirred for another thirty minutes after which time 18.2 grams of allyl bromide was added. The cooling was stopped and the solution was allowed to warm up. A delayed exothermic reaction was noted. After twenty minutes, bring the solution temperatures to about 10° C. above ambient temperature. When the temperature ultimately dropped, the catalyst solution was aged by heating at 65° C. for ninety minutes. The catalyst prepared had a [butanol-DIBAH]Nd-allyl bromide-butadiene molar ratio of [2-13]-1-2-20, respectively, and a concentration of 0.025 molarity with respect to the neodymium.

To a solution of 128.6 grams of isoprene and 129 grams of dry hexane in a one gallon (3.79 liter) reactor under nitrogen at 65° C., was added 20.7 milliliters (0.2 mmoles of neodymium/100 grams of total monomer [Bd+Ip]) of the above prepared catalyst. The polymerization was carried out with stirring for two hours and twenty minutes. Samples were taken during the polymerization as described in Example 1. Analyses of the samples showed that the incorporation of butadiene to isoprene (measured at low conversion) was 1.4/1 by weight indicating formation of a highly random, non-tapered isoprene-butadiene rubber. The yield was 87%. The Mooney of the dried rubber was 87; the Tg was −97° C.

COMPARATIVE EXAMPLE 4

In this experiment, an isoprene-butadiene copolymer was synthesized using an alcohol modified neodymium catalyst system with a different catalyst component molar ratio than that described in Example 3. In this procedure, a one gallon (3.78 liter) reactor was charged with 1,088 grams of hexane containing 93.5 grams of butadiene and 668 grams of 1.23 molar diisobutylaluminum hydride (DIBAH) in hexane (i.e., 25% weight percent DIBAH). To this solution was added 26.22 grams of n-butanol with stirring and with temperatures maintained at 20° C. After stirring for thirty minutes, 107.5 grams of a 10.1% neodymium solution (neodymium neodecanoate), dilute with 158 grams of dry hexane, was charged to the reactor. The solution was stirred for another thirty minutes after which time 21.4 grams of allyl bromide was added. The cooling was stopped and the mixture allowed to warm up to ambient (and above) temperature. After the exotherm subsided, requiring about one hour, the catalyst solution was heat aged at 65° C. for ninety minutes. The aged catalyst was then cooled and stored in a dry container under nitrogen. The catalyst prepared had a [butanol-DIBAH] Nd-allyl bromide-butadiene molar component ratio of [4.7-15.5]-1-2.35-23, respectively, and a concentration of 0.025 molarity with respect to the neodymium.

Using the method described in Examples 1 and 3, a solution of 128 grams of isoprene and 128 grams of butadiene in 1,579 grams of dry hexane was polymerized using 29.6 milliliters of the above prepared catalyst. Samples of the polymerization batch at different time intervals showed a butadiene to isoprene incorporation ratio (measured at low conversion) of 1.35/1. After two hours and ten minutes, an 88% yield of the copolymer was obtained. A Mooney viscosity of the dried copolymer was 97 and its the Tg was −90° C.

COMPARATIVE EXAMPLE 5

In this experiment, an isoprene-butadiene copolymer was synthesized using an alcohol modified neodymium catalyst system modified with 1,4-butanediol. In this procedure, a one gallon (3.78 liter) reactor was charged with 1,093 grams of hexane containing 81.9 grams of butadiene and 663 grams of 1.2 molar diisobutylaluminum hydride (DIBAH) in hexane (i.e., 25% weight percent DIBAH). To this solution was then added 6.78 grams of 1,4-butanediol with stirring and with temperatures maintained at 20° C. The suspension of the butanediol gradually dissolved upon reacting with the DIBAH. After one hour of stirring, 105.4 grams of a 10.3% neodymium solution (neodymium neodecanoate), diluted with 165 grams of hexane, was added to the reactor. The solution was stirred for another thirty minutes after which time 19.1 grams of allyl bromide was added. The cooling was stopped and the mixture allowed to warm up to ambient (and above) temperature. After the exotherm subsided, the catalyst solution was aged by heating at 65° C. for ninety minutes. The catalyst prepared had a [butanediol-DIBAH]-ND-allyl bromide-butadiene molar component ratio of [1-16]-1-2-20, respectively, and a concentration of 0.025 molarity with respect to the neodymium. The aged catalyst was then cooled and stored in a dry container under nitrogen.

Using the polymerization procedure described in the earlier examples, 123 grams of isoprene and 124 grams of butadiene in 1,546 grams of dry hexane was polymerized using 14.2 milliliters of the above prepared catalyst. Analyses of samples taken during the polymerization show the ratio of the incorporation of butadiene to isoprene (measured at low conversion) was 1.44/1. A yield of 87% was obtained after 130 minutes.

COMPARATIVE EXAMPLE 6

In this experiment, an isoprene-butadiene copolymer rubber was prepared using another rare earth metal, praseodymium. In the procedure employed, a one gallon (3.78 liter) reactor was charged with 1,000 grams of a dry hexane solution containing 82 grams of 1,3-butadiene, followed by 663 grams of a 1.2 molar diisobutylaluminum hydride (DIBAH) in hexane. A solution of 21.5 grams triphenylsilanol dissolved in 250 grams of toluene was then charged into the reactor at a temperature of 20° C. After stirring for about forty minutes, 85.9 grams of a 0.826 molar solution of praseodymium octoate, diluted with 195 grams of hexane, was charged to the reactor. The solution was allowed to stir for forty-five minutes after which 19.1 grams of allyl bromide was added. The cooling was stopped and the mixture was allowed to warm up to ambient temperature (and above). After stirring for about one hour, the catalyst system was aged by heating at 65° C. for ninety minutes. The catalyst prepared had a [silanol-DIBAH]-Pr-allyl bromide-butadiene component molar ratio of [1-15]-1-2-20, respectively, and a concentration of 0.025 molarity with respect to the neodymium. The aged catalyst was then cooled and stored in a dry container under nitrogen.

Using the polymerization procedure described in Examples 1 and 3, 124 grams of isoprene and 125 grams of butadiene in 1,439 grams of dry hexane were polymerized using 19.6 milliliters of the above praseodymium-based catalyst. Samples of the polymerization solution during the run showed that the rate of incorporation of the butadiene to isoprene (measured at low conversion) was 1.7/1 by weight. A yield of 37% was obtained after one hour and forty minutes. The Mooney of the dried sample was 64 and its Tg was −96° C.

COMPARATIVE EXAMPLE 7

In this experiment, the copolymerization of Example 6 was repeated with a praseodymium-based catalyst prepared as described in Example 6 except without the triphenylsilanol modifier.

Analyses of the samples of the copolymerization showed that the rate of incorporation of the butadiene to isoprene (measured at low conversion) was 16/1 by weight, indicating formation of a somewhat tapered copolymer, in contrast to the highly random copolymer formed when the triphenylsilanol catalyst modifier was employed.

EXAMPLE 8

An alkylated neodymium catalyst system was made in this experiment. In the procedure used, 30 milliliters of a 0.507 M solution of neodymium neodecanoate ($NdV_3$) in hexanes was charged to a dried 8 oz. (236.6 ml) bottle under a blanket of nitrogen at room temperature. Then, 152.1 ml. of a 1.0 M tri n-octyl aluminum (TOA) in hexanes solution was slowly added to the $NdV_3$ solution. The resulting light blue mixture was then heated in a rotating polymerization bath at 70° C. for 30 minutes. The molar ratio of TOA to Nd was 10:1. The solution turned darker brown color in less than 10 minutes. The concentration of this Nd catalyst was 0.0835 M. The solution made was soluble in hexanes. These alkylated neodymium catalysts can be prepared in a heated loop or a mixer outside of a polymerization reactor prior to use as the co-catalyst for polymerization in a batch or a continuous system. The catalyst components made by this procedure are vary stable and can be stored for periods of at least one year before being used. Thus, such catalyst components can be stored, shipped, and used as needed.

EXAMPLE 9

In this example, an active preformed neodymium catalyst was prepared. In the procedure used 1.0 ml of carbon tetrachloride was added to a 4 oz (118.3 ml) bottle containing 23.95 ml. of a pre-alkylated neodymium catalyst at room temperature. The molar ratio of neodymium to TOA was 1:10. A lighter color was observed with the final color being a clear dark red.

EXAMPLE 10

In this experiment, a polybutadiene rubber was prepared using the preformed neodymium catalyst described in Example 9. In the procedure used 1293 g of a silica/alumina/molecular sieve dried premix containing 15.47% weight percent 1,3-butadiene in hexanes was charged into a one-gallon (3.8 liters) reactor. Then, 25.95 ml of the preformed neodymium catalyst prepared in Example 9 was added to the reactor. The amount of neodymium utilized was 1.0 mmole per 100 grams of 1,3-butadiene monomer.

The polymerization was carried out at 70° C. The GC analysis of the residual monomer contained in the polymerization mixture indicated that the 90% of butadiene monomer was consumed after approximately 60 minutes. The polymerization was continued for an additional 30 minutes. As the polymer was removed from the reactor it was shortstopped with ethanol and stabilized with 2,6-ditertbutylphenol. The cement was then placed into a drying oven to remove solvent. Final solvent removal was done in a vacuum oven at 50° C. The resulting polybutadiene rubber had a glass transition temperature (Tg) of −109.5° C. with a melting point (Tm) of −11.6° C. The Mooney viscosity (ML-4) at 100° C. for this polymer was determined to be 39. The GPC measurements indicated that the polymer had a number average molecular weight (Mn) of about 160,000 and a weight average molecular weight (Mw) of about 400,000. The polydispersity (Mw/Mn) of the resulting polymer was accordingly 2.5.

EXAMPLE 11

The procedure used in Example 10 was repeated in this experiment except that a 50/50 weight percent mixture of isoprene and 1,3-butadiene was employed as the monomer. Samples taken during the polymerization showed that the ratio of incorporation of 1,3-butadiene to isoprene into the polymer was about 3:2 (at low conversion levels). After a polymerization time of about 2 hours a yield of about 80% was attained. The isoprene-butadiene rubber had a Mooney ML 1+4 viscosity of about 90 and had a glass transition temperature of −90° C.

EXAMPLE 12

The preparation of an alkylated neodymium catalyst is described in this example. In the procedure used, 20 milliliters of a 0.506 M neodymium neodecanoate ($NdV_3$) solution in hexanes was charged to a dried 8 oz (237 ml.) bottle under nitrogen at room temperature. Then, 142 ml. of 1M tri-n-octyl aluminum (TOA) in hexanes (the hexanes solvent used was a mixture of various hexane isomers) was slowly added to above $NdV_3$ solution. The resulting light blue mixture was then heated in a rotating polymerization bath at 70° C. for 10 to 60 minutes. The molar ratio of TOA to Nd was 14:1. The solution turned darker brown color in less than 10 minutes. The concentration of this Nd catalyst was 0.063 M. Other alkylated Nd catalysts were prepared similarly with tri-ethylaluminum (TEA), tri-isobutyl aluminum (TIBA), di-isobutylaluminum hydride (DIBAH) and tri-n-hexyl aluminum (THA). All alkylated Nd catalysts were soluble in hexanes solvent. These alkylated Nd catalysts can be prepared in a heated loop or a mixer outside of a polymerization reactor prior to use as the co-catalyst for polymerization in a batch or a continuous systems.

EXAMPLE 13

In this example, an active preformed neodymium catalyst was prepared. 0.47 ml of a neat t-amyl chloride (t-AmCl, 7.96 M) was added dropwise, with shaking, to a 4 oz (118 ml.) bottle containing 30 ml. of a pre-alkylated Nd catalyst (0.063 M as described in Example 12) at room temperature. A vigorous reaction took place. The resulting light brown mixture was used for polymerizing isoprene 1,3-butadiene or a mixture of 1,3-butadiene and isoprene. The molar ratio of Nd to TOA and to t-AmCl were 1:14:2.

EXAMPLE 14

In this experiment, a polyisoprene was prepared using a preformed Nd catalyst as described in Example 13. In the procedure used 2000 grams of a silica/alumina/molecular sieve dried premix containing 19.90 weight percent isoprene in hexanes was charged into a one-gallon (3.8 liter) reactor. Then, 14.1 ml of a preformed Nd catalyst made by the procedure described in Example 13 was added to the reactor. The amount of Nd used was 0.22 mmole per 100 grams of isoprene monomer.

The polymerization was carried out at 90° C. The GC analysis of the residual monomer contained in the polymerization mixture indicated that the 90% of isoprene monomer was consumed after 14 minutes. The polymerization was continued for an additional 30 minutes. Then, 1 ml. of neat ethanol was added to shortstop the polymerization. The polymer cement was then removed from the reactor and stabilized with 1 phm of antioxidant. After evaporating hexanes, the resulting polymer was dried in a vacuum oven at 50° C.

The polyisoprene produced was determined to have a glass transition temperature (Tg) at −67° C. It was then determined to have a microstructure, which contained 95.6 percent cis-1,4-polyisoprene units, 1.4 percent trans-1,4-polyisoprene units, and 3.0 percent 3,4-polyisoprene units. The Mooney viscosity (ML-4) at 100° C. for this polymer was determined to be 82. This polymer was also determined to have a stereo regularity count (head to tail) of 99.6%. The GPC measurements indicated that the polymer has a number average molecular weight (Mn) of 429,000 and a weight average molecular weight (Mw) of 1,032,000. The polydispersity (Mw/Mn) of the resulting polymer was determined to be 2.41.

COMPARATIVE EXAMPLE 15

In this example, a polysoprene was prepared using a pre-alkylated Nd catalyst as described in Example 12 and the co-catalyst t-AmCl was added separately to the reactor containing isoprene monomer. The procedure described in Example 14 was utilized in this example except that a pre-alkytared Nd catalyst (as described in Example 12) was used as the catlaylst and, 1.75 ml of a 1M solution of t-AmCl (in hexane) was subsequently added to the reactor containing isoprene premix in the reactor. The GC analysis of the residual monomer contained in the polymerization mixture indicated that 90 percent of isoprene was consumed after 350 minutes at 90° C. The polymerization was continued for an additional 30 minutes. The polymer was then recovered as described in Example 14. The resulting polymer had a glass transition temperature (tg) at −67° C. It was also determined to have a Mooney viscosity (ML-4) at 100° C. of 72. The GPC measurements indicated that the polymer has a number average molecular weight (Mn) of 476,000 and a weight average molecular weight (Mw) of 1,182,000. The polydispersity (Mw/Mn) of the resulting polymer was 2.48. A rate and polymer characteristics comparison of the polyisoprenes prepared using ND catalysts described in Examples 12 and 13 are tabulated in table 1.

TABLE 1

| Example No | Catalyst | Time to 90% conversion (min.) | Tg (° C.) | ML-4 | Molecular weight by GPC Mn | Mw | Mw/Mn |
|---|---|---|---|---|---|---|---|
| 14 | Preformed Nd with t-AmCl | 14 | −67 | 82 | 429K | 1,032K | 2.41 |
| 15 | Pre-alkylated Nd with t-AmCl added separately | 350 | −67 | 72 | 476K | 1,182K | 2.48 |

EXAMPLE 16

In this experiment, a 30/70 isoprene-butadiene rubber (IBR) was prepared using a preformed catalyst described in Example 13. The procedure described in Example 14 was utilized in this example except that a premix containing a 30:70 mixture of isoprene and 1,3-butadiene was used as the monomers. GC analysis of the residual monomer indicated that 90 percent of monomers were consumed after 9 minutes. The polymerization was continued for an additional 21 minutes.

The resulting IBR was then recovered as described in Example 14. It was determined to have a glass transition temperature at −102° C. The Mooney viscosity (ML-4) at 100° C. for this polymer was determined to be 102. It was then determined to have a microstructure which contained 67.7 percent cis-1,4-polybutadiene units, 1.4 percent trans-1,4-polybutadiene units, 0.8 percent 1,2-polybutadiene unit, 28.9 percent cis-1,4-polyisoprene units, 0.3 percent trans-1,4-polyisoprene unit, and 0.9 percent 3,4-polyisoprene unit. The GPC measurements indicated that the IBRs have a number average molecular weight (Mn) of 427,000 and a weight average molecular weight (Mw) of 1,029,000. The polydispersity (Mw/Mn) of the resulting polymer was 2.14.

COMPARATIVE EXAMPLE 17

In this exampie, a 30/70 IBR was prepared using the procedure described in Example 16 except that a premix containing a 30:70 mixture of isoprene and 1,3-butadlene was used as the monomers. The GC analysis of the residual monomer contained in the polymerization mixture indicated that 90% of isoprene was consumed after 276 minutes at 90° C. The polymerization was continued for an additional 30 minutes. The polymer was then recovered as described in Example 14. The resulting polymer had a Tg at −102° C. It was also determined to have a Mooney viscosity (ML-4) at 100° C. of 103. The GPC measurements indicated that the polymer has a number average molecular weight (Mn) of 417,000 and a weight average molecular weight (Mw) of 1.021,000. The polydispersity (Mw/Mn) of the resulting polymer is 2.44. A rate and polymer characteristics comparison of the IBRs prepared using Nd catalysts described in Examples 12 and 13 are tabulated in Table 2.

TABLE 2

| Example No | Catalyst | Time to 90% conversion (min.) | Tg (° C.) | ML-4 | Molecular weight by GPC Mn | Mw | Mw/Mn |
|---|---|---|---|---|---|---|---|
| 16 | Preformed Nd with t-AmCl | 9 | −102 | 102 | 427K | 1,029K | 2.41 |
| 17 | Pre-alkylated Nd with t-AmCl added separately | 276 | −102 | 103 | 417K | 1,021K | 2.48 |

EXAMPLES 18–19

In these examples, polyisoprenes are prepared using a preformed Nd catalyst as described in Example 13. The molar ratio of Nd to TOA and to t-AmCl was 1:14:2. The procedure described in Example 14 was utilized in these examples except that the polymerization temperature was changed to 60° C. and 40° C., respectively. The time needed for 90% monomer conversion, Tg and ML-4 of the resulting polyisoprenes are listed in Table 3.

TABLE 3

| Example No. | Nd/TOA/ t-AmCl Ratio | Polymerization Temperature (° C.) | Time to 90% Conversion (min.) | Tg (° C.) | ML-4 |
|---|---|---|---|---|---|
| 14 | 1/14/2 | 90 | 14 | −67 | 82 |
| 18 | 1/14/2 | 60 | 21 | −67 | 86 |
| 19 | 1/14/2 | 40 | 80 | −67 | 95 |

EXAMPLES 20–22

In these examples, polyisoprenes were prepared using a preformed Nd catalyst as described in Example 13. However, the molar ratio of Nd to TOA and to t-AmCl was changed to 1:10:2. The procedure described in Example 14 was utilized in these examples and the polymerizations were conducted at 90° C., 75° C., and 60° C. The time needed to attain 90 percent monomer conversion, Tg, and ML-4 of the resulting polyisoprenes are listed in Table 4.

TABLE 4

| Example No. | Nd/TOA/ t-AmCl Ratio | Polymerization Temperature (° C.) | Time to 90% Conversion (min.) | Tg (° C.) | ML-4 |
|---|---|---|---|---|---|
| 20 | 1/10/2 | 90 | 12 | −67 | 82 |
| 21 | 1/10/2 | 75 | 23 | −67 | 87 |
| 22 | 1/10/2 | 60 | 60 | −67 | 91 |

EXAMPLES 23–25

In these examples, polyisoprenes are prepared using a preformed Nd catalyst as described in Example 13. However, the molar ratio of Nd to TOA and to t-AmCl was changed to 1:20:2. The procedure described in Example 14 was utilized in these examples and the polymerization was conducted at 90° C., 75° C., and 60° C. The time needed for 90% monomer conversion, Tg, and ML-4 of the resulting polyisoprenes are listed in Table 5.

TABLE 5

| Example No. | Nd/TOA/ t-AmCl Ratio | Polymerization Temperature (° C.) | Time to 90% Conversion (min.) | Tg (° C.) | ML-4 |
|---|---|---|---|---|---|
| 26 | 1/20/2 | 90 | 17 | −67 | 53 |
| 27 | 1/20/2 | 75 | 23 | −67 | 77 |
| 28 | 1/20/2 | 60 | 60 | −67 | 90 |

EXAMPLES 26–28

In these examples, polyisoprenes are prepared using a preformed Nd catalyst as described in Example 13. However, the molar ratio of Nd to TOA and to t-AmCl was changed to 1:30:2. The procedure described in Example 14 was utilized in these examples and the polymerization was conducted at 90° C., 75° C., and 60° C. The time needed for 90% monomer conversion, Tg and ML-4 of the resulting polyisoprenes are listed in Table 6.

TABLE 6

| Example No. | Nd/TOA/ t-AmCl Ratio | Polymerization Temperature (° C.) | Time to 90% Conversion (min.) | Tg (° C.) | ML-4 |
|---|---|---|---|---|---|
| 26 | 1/30/2 | 90 | 20 | −67 | 40 |
| 27 | 1/30/2 | 75 | 26 | −67 | 51 |
| 28 | 1/30/2 | 60 | 80 | −67 | 77 |

While certain representative embodiments and details have been shown for the purpose of illustrating the subject invention, it will be apparent to those skilled in this art that various changes and modifications can be made therein without departing from the scope of the subject invention.

What is claimed is:

1. A process for the synthesis of isoprene-butadiene rubber which comprises copolymerizing isoprene monomer and 1,3-butadiene monomer in an organic solvent in the presence of a Group III-B metal containing catalyst system that is made by the sequential steps of (I) reacting an organometalic compound that contains a metal from Group III-B of the Periodic System with an organoaluminum compound at a temperature which is within the range of 50° C. to 100° C. to produce an aluminum modified Group III-B metal containing catalyst component, and (II) mixing the aluminum modified Group III-B metal containing catalyst component with a halogen containing compound to produce the Group III-B metal containing catalyst system, wherein the catalyst system is void of compounds selected from the group consisting of aliphatic alcohols, cycloaliphatic alcohols, aliphatic thiols, cycloaliphatic thiols, trialkyl silanols, and triaryl silanols, wherein the organometalic compound that contains a metal from Group III-B of the Periodic System is reacted with the organoaluminum compound in the absence of conjugated diene monomers, wherein the copolymerization is carried out in a reactor, wherein the catalyst system is prepared in the absence of compounds that contain labile halogen atoms.

2. A process as specified in claim 1 wherein the organoaluminum compound and the organometallic compound that contains a metal from Group III-B of the Periodic System are allowed to react for a period of at least about 5 minutes to produce the aluminum modified Group III-B metal containing catalyst component.

3. A process as specified in claim 1 wherein the organoaluminum compound and the organomerallic compound that contains a metal from Group III-B of the Periodic System ere allowed to react for a period of time that is within the range of about 5 minutes to about 25 minutes to produce the aluminum modified Group III-B metal containing catalyst component.

4. A process as specified in claim 2 wherein the Group III-B metal in the organometallic compound is a lanthanide selected from the group consisting of cerium, praseodymium, neodymium, and gadolinium.

5. A process as specified in claim 1 wherein the copolymerization is conducted at a temperature that is within the range of about 30° C. to about 85° C.; and wherein the organic solvent contains from about 5 weight percent to about 35 weight percent monomers.

6. A process as specified in claim 5 wherein the Group III-B metal in the organometallic compound is neodymium.

7. A process as specified in claim 6 wherein the catalyst system is present at a level sufficient to provide from 0.05 to 0.5 millimoles of the neodymium per 100 grams of total monomers.

8. A process as specified in claim 4 the molar ratio of the halogen containing compound to the lanthanide metal in the lanthanide containing catalyst component is within the range of about 1:1 to about 5:1.

9. A process as specified in claim 4 wherein the molar ratio of the amount of the halogen containing compound to the lanthanide metal in the lanthanide containing catalyst component is within the range of about 3:2 to about 3:1.

10. A process as specified in claim 4 wherein the molar ratio of the amount of the halogen containing compound to the lanthanide metal in the lanthanide containing catalyst component is within the range of 1.8:1 to about 5:2.

11. A process as specified in claim 6 wherein the organoaluminum compound is of the structural formula:

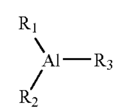

wherein $R_1$, $R_2$, and $R_3$ can be the same or different and represent alkyl groups containing from 2 to about 8 carbon atoms.

12. A process as specified in claim 11 wherein $R_1$, $R_2$, and $R_3$ represent alkyl groups which contain from about 3 to about 6 carbon atoms.

* * * * *